United States Patent [19]

Brahm et al.

[11] 4,242,318

[45] Dec. 30, 1980

[54] PROCESS FOR THE PREPARATION OF AQUEOUS SUSPENSIONS CONTAINING AT LEAST 65% BY WEIGHT OF CALCIUM CARBONATE

[75] Inventors: Jacques Brahm, Grimbergen; Jean-Pierre De Rath, Brussels, both of Belgium

[73] Assignee: Solvay & Cie., Brussels, Belgium

[21] Appl. No.: 923,195

[22] Filed: Jul. 10, 1978

[30] Foreign Application Priority Data

Jul. 11, 1977 [LU] Luxembourg ............................ 77723

[51] Int. Cl.$^3$ .......................... C01F 5/24; C01F 11/18
[52] U.S. Cl. .................................. 423/430; 423/265; 106/306
[58] Field of Search ............... 423/430, 432, 266, 267; 106/306

[56] References Cited

U.S. PATENT DOCUMENTS

| | | | |
|---|---|---|---|
| 2,709,160 | 5/1955 | Korejwa ............................... | 106/306 |
| 3,245,819 | 4/1966 | Eberts .................................. | 423/266 |
| 3,347,624 | 10/1967 | Taylor ................................. | 423/430 |
| 3,661,610 | 5/1972 | Ferris .................................. | 106/306 |
| 3,797,610 | 3/1974 | Windle ................................ | 106/306 |
| 3,945,843 | 3/1976 | Holty et al. ......................... | 106/306 |
| 3,989,195 | 11/1976 | Falcon-Steward et al. ......... | 106/306 |
| 4,018,877 | 4/1977 | Woode ................................ | 423/432 |

FOREIGN PATENT DOCUMENTS

| | | | |
|---|---|---|---|
| 46-12292 | 3/1971 | Japan ................................... | 423/432 |
| 46-14821 | 4/1971 | Japan ................................... | 423/430 |
| 1285891 | 8/1972 | United Kingdom ................ | 423/430 |

OTHER PUBLICATIONS

Williams et al., "Effect of Polyelectrolytes on the Precipitation of Calcium Carbonate", JACS, vol. 79, Sep. 57, pp. 4898–4900.

*Primary Examiner*—O. R. Vertiz
*Assistant Examiner*—Gary P. Straub
*Attorney, Agent, or Firm*—Spencer & Kaye

[57] ABSTRACT

Process for the preparation of an aqueous suspension containing at least 65% by weight of calcium carbonate, in which process calcium carbonate is crystallized in a dilute aqueous medium, a wet concentrate of calcium carbonate is separated from the resulting dilute aqueous suspension of calcium carbonate and the said calcium carbonate concentrate is fluidized and homogenized in the presence of a dispersing agent. The calcium carbonate is crystallized in the presence of a water-soluble polyelectrolyte and the calcium carbonate concentrate is separated from the dilute suspension of calcium carbonate by essentially mechanical separating means.

19 Claims, No Drawings

PROCESS FOR THE PREPARATION OF AQUEOUS SUSPENSIONS CONTAINING AT LEAST 65% BY WEIGHT OF CALCIUM CARBONATE

BACKGROUND OF THE INVENTION

The present invention relates to the preparation of concentrated aqueous suspensions of calcium carbonate by crystallizing calcium carbonate in an aqueous medium.

In order to reduce the storage bulk of calcium carbonate crystals intended especially for the paper, plastics and paint industries, and, furthermore, in order to facilitate their handling, it is advantageous to store and transport them in the form of concentrated aqueous suspensions generally containing from 65 to 80% by weight of crystals.

For this purpose, Belgian Pat. No. 819,747 of Gewerkschaft Victor Chemische Werke, filed on the 10th of September 1974, proposes a process in which calcium carbonate is crystallized in an aqueous medium, the resulting aqueous suspension of calcium carbonate is filtered in order to separate a wet concentrate of calcium carbonate therefrom, the calcium carbonate concentrate is fluidized and homogenized in the presence of a dispersing agent and the concentrated suspension of calcium carbonate thus obtained is ground wet.

This known process exhibits the disadvantage that it requires an expensive grinding operation. In fact, this operation is necessitated by the need to break up the numerous coarse agglomerates of calcium carbonate crystals present in the wet concentrate of calcium carbonate. In addition to its unfavorable influence on the cost of the process, this grinding operation exhibits the disadvantage that it gives rise to the formation of calcium carbonate fines which are not generally suitable as a filler.

An attempt has been made to omit the grinding operation by crystallizing the calcium carbonate in an aqueous medium containing an alkali metal salt or alkaline earth metal salt of nitrilotriacetic acid, as a dispersing agent, and by then filtering the resulting dilute suspension of calcium carbonate, as described in Published German Patent Application No. 1,116,203, filed on the 13th of October 1959 in the name of Farbenfabriken Bayer AG.

The filter cakes obtained by this known process are in the form of aqueous suspensions of fine crystals which are very suitable as a filler in papermaking, plastics and paint. However, the concentration of calcium carbonate crystals in these aqueous suspensions is generally insufficient to enable them to be stored and handled economically, with the result that it is necessary to concentrate them by evaporation.

SUMMARY OF THE PRESENT INVENTION

It has now been found, in accordance with the present invention, that by carrying out the crystallization under special conditions, it is possible to obtain concentrated aqueous suspensions of fine and regular crystals of calcium carbonate, which generally contain more than 65% by weight of solids, without grinding or evaporation being necessary.

The present invention, in accordance with its purpose, provides a process for the preparation of an aqueous suspension containing at least 65% by weight of calcium carbonate, in which process calcium carbonate is crystallized in a dilute aqueous medium, a wet concentrate of calcium carbonate is separated from the resulting dilute aqueous suspension of calcium carbonate and the calcium carbonate concentrate is fluidized and homogenized in the presence of a dispersing agent, comprising: crystallizing the calcium carbonate in the presence of a water-soluble polyelectrolyte, and separating the wet concentrate from the dilute aqueous suspension by essentially mechanical separating means.

It is to be understood that both the foregoing general description and the following detailed description are exemplary, but are not restrictive of the invention.

DETAILED DESCRIPTION OF THE PRESENT INVENTION

The term polyelectrolyte as used herein is to be understood as meaning a polymeric substance in which the monomeric units possess ionizable groups and which is composed, on the one hand, of a macro-ion formed by ionic groups of the same sign which are joined to one another by chemical bonds, and, on the other hand, of a series of counter-ions of opposite charge to that of the macro-ion (Encyclopedia of Polymer Science and Technology, John Wiley & Sons, 1969, Volume 10, page 781).

Within the scope of the present invention, it has proved valuable to use polyacids, or their salts, which are polyelectrolytes generating, on dissociation, polymeric anions (polyanions) and elementary cations such as, for example, protons or monovalent cations derived from alkali metals (loc. cit., pages 781 to 784). Polyacids of weakly acid character are preferably used, these being defined as polyacids having a pK, measured on a 0.01 N solution in pure water, of more than 4 and preferably of more than 6 (loc. cit., pages 787 to 788).

Polyacids of weakly acid character which are very suitable within the scope of the present invention are those derived from polymers containing at least one carboxyl group per 10 carbon atoms. By way of examples of polyacids which can be used in the process according to the present invention, polymers derived from acrylic, methacrylic and alpha-hydroxyacrylic acids, maleic acid copolymers, carboxylated derivatives of cellulose ethers, and their alkali metal salts, may be especially mentioned.

According to the present invention, particularly advantageous polyelectrolytes include alkali metal salts of polyacrylic acids and of their derivatives such as poly-alpha-hydroxyacrylic acids, and more particularly that known under the name Polysel CA (BASF) which is based on sodium polyacrylate.

In the process according to the present invention, the calcium carbonate can be crystallized in an aqueous medium by any means which is in itself known, for example by reacting a calcium salt solution with an ammonium carbonate or alkali metal carbonate solution.

According to the present invention, the calcium carbonate is advantageously crystallized by carbonating a milk of lime, preferably by means of a gas containing $CO_2$. In this embodiment of the present invention, it is possible, for example, to use a milk of lime containing between 25 and 350, and preferably between 50 and 250, kg of CaO per $m^3$, which is prepared, in a manner which is in itself well-known, by dispersing, in water, quicklime which originates from the burning of limestone in a lime kiln. A gas having a low $CO_2$ content, for example boiler fumes containing from 5 to 15% by volume of $CO_2$, can be used to carbonate the milk of lime. As a variant, it is of course also possible to use a gas which has a high $CO_2$ content and contains more than 30% of $CO_2$, such as the gas recovered from the lime kilns.

The respective amounts of milk of lime and carbonation gas must be sufficient to ensure that the lime is carbonated as completely as possible. Of course, these amounts depend on the respective concentrations of the milk of lime and the gas, as well as on the working conditions, and, in each particular case, they can easily be established by experiment. The crystallization is preferably carried out at a temperature of the order of 25° to 60° C., for example at about 30° to 50° C.

In the process according to the present invention, the amount of polyelectrolyte polymer incorporated in the aqueous medium depends on various factors, including the working conditions during the crystallization and the nature of the polymer used. It can easily be determined by experiment in each case. By way of example, in the particular case where the calcium carbonate is crystallized by carbonating a milk of lime, between 1 and 10 g, and preferably between 2 and 6 g, of alkali metal polyacrylate per kg of solids in the resulting dilute aqueous suspension of calcium carbonate can advantageously be used as the polyelectrolyte.

The term calcium carbonate concentrate is to be understood as meaning a wet cake of calcium carbonate, which has been formed from the abovementioned dilute aqueous suspension of calcium carbonate.

According to the present invention, essentially mechanical separating means are used for separating the calcium carbonate concentrate from the dilute aqueous suspension of calcium carbonate. Within the scope of the present invention, the term essentially mechanical separating means is to be understood as signifying means by which a suspension of a solid in a liquid is physically separated into at least one phase having a very high concentration of solid and one very dilute phase, without adding further solid to the suspension, without a change taking place in the state of one or other of the constituents of the suspension, and in particular without evaporation or solidification of the liquid taking place.

For example, filtration, draining or decantation of the dilute aqueous suspension, which are techniques which are in themselves well-known, can be used, according to the present invention, as the mechanical separating means. As a variant, it is also possible to combine two or more different mechanical separating means.

According to the present invention, filtration, which is a technique which is in itself well-known, is preferably used as the mechanical separating means, the filter cake collected on the filter then constituting the abovementioned wet concentrate. In a manner which is in itself known, the dilute suspension is advantageously filtered under pressure, for example at between 0.5 and 15 kg/cm², and this filtration is optionally followed by compression of the filter cake under a pressure of between 1 and 20 kg/cm² and by sweeping with a stream of air under a pressure of 0.5 to 6 kg/cm². The temperature at which the filtration and also the optional compression and sweeping operations are carried out has not proved to have a notable influence on the result of the filtration. In general terms, the latter can be carried out, for example, at between 15° and 50° C., and advantageously at ambient temperature.

The fluidization of the calcium carbonate concentrate comprises subjecting the latter to a mechanical process which converts it into a fluid aqueous suspension which can be pumped. It is generally carried out, in a manner which is in itself known, by malaxating the concentrate, for example using a blade mixer, a plate mixer or a rotary cone mixer.

The homogenization serves the purpose of ensuring that the calcium carbonate crystals are dispersed efficiently and homogeneously in the abovementioned fluid aqueous suspension resulting from the fluidization operation. It is generally achieved by subjecting the suspension to turbulence or an intense shearing process by means of a high-speed disperser, for example of the type having blades, plates or knives.

In the process according to the present invention, the fluidization and homogenization are preferably carried out separately.

The dispersing agent used during the fluidization and homogenization serves the purpose of facilitating the dispersion of the calcium carbonate crystals, while preventing the formation of agglomerates of crystals. For example, it can comprise an inorganic dispersing agent, such as the commercially available dispersing agent known under the name Calgon (Calgon Corp.), which is based on an alkali metal polyphosphate. As a variant, the dispersing agent can also comprise, at least in part, an organic dispersing agent, for example a dispersing agent chosen from among polyelectrolytes and preferably polyacids.

Commercially available dispersing agents which have proved particularly efficient are those known under the names Polysel CA (BASF), which is a dispersing agent based on sodium polyacrylate, and Dispagil (Rhone-Progil), which is a dispersing agent based on an alkali metal polyphosphate and an alkali metal polyacrylate.

The dispersing agent is preferably added to the calcium carbonate concentrate before carrying out the fluidization and homogenization. It can optionally be added to the dilute aqueous suspension of calcium carbonate before separation of the calcium carbonate concentrate. However, it has been observed, in practice, that it is preferable to add the dispersing agent to the calcium carbonate concentrate after separation of the latter from the aqueous suspension because, all other things being equal, this results in a reduction in the amount of dispersing agent required.

The amount of dispersing agent used for fluidizing and homogenizing the calcium carbonate concentrate depends on various factors, including the nature of the the dispersing agent, the particle size of the calcium carbonate crystals and the proportion of calcium carbonate in the concentrate. It can easily be determined by experiment in each case. In general terms, it is advantageously between 2 and 10 g, and preferably 4 and 8 g, per kg of calcium carbonate in the concentrate.

The process according to the present invention makes it possible to obtain easily, rapidly and economically, stable, concentrated aqueous suspensions of regular crystals of calcium carbonate, which generally contain at least 65%, and preferably from 68 to 75%, by weight of crystals, without requiring an expensive evaporation or grinding treatment.

These concentrated suspensions are very suitable for long periods of storage and for handling, without thereby affecting their stability. The calcium carbonate crystals present in these suspensions are well formed, regular and fine, with a narrow particle size distribution. They are very suitable as a filler in papermaking, paint and the manufacture of plastics.

The following application examples will illustrate the invention without, however, limiting its scope.

In these examples, a milk of lime was carbonated with a gas containing $CO_2$. The dilute aqueous suspension of calcium carbonate thus obtained was then filtered under a maximum pressure of 4.5 kg/cm$^2$, the filter cake obtained was compressed under a maximum pressure of 17 kg/cm$^2$, in order to drain it, and then swept with air under a pressure of 5.3 kg/cm$^2$ for 10 minutes, this producing a wet concentrate of calcium carbonate. Thereafter, this concentrate of calcium carbonate was fluidized and then homogenized by successively passing it into a malaxator and then a disperser, this producing an aqueous suspension of calcium carbonate.

Examples 1 and 2 relate to experiments according to the present invention and Example 3 is by way of comparison.

EXAMPLE 1

Before carbonation, Polysel CA, which is a commercially available polyelectrolyte based on sodium polyacrylate, was introduced into the milk of lime which contained about 120 kg of CaO per m$^3$. The amount of Polysel CA introduced into the milk of lime was controlled so that it approximately corresponded to 2.5 g of Polysel CA per kg of crystalline calcium carbonate. The milk of lime was then carbonated with a gas containing between 23 and 27% of $CO_2$, at a flow rate of 1,350 m$^3$/hour for 7 hours 15 minutes. The temperature was kept at 37° C.

The calcium carbonate concentrate collected on the filter was fluidized and homogenized in the presence of Calgon which is a commercially available dispersing agent based on sodium polyphosphate. 7 g of Calgon were used per kg of calcium carbonate in the concentrate. A concentrated aqueous suspension containing 68% of regular crystals of calcium carbonate was thus obtained. This aqueous suspension remained stable for more than 30 days.

The particle size distribution of the calcium carbonate crystals is set out in Table I, below.

TABLE I

| Particle size | g/kg |
|---|---|
| >20 μ | 11 |
| >10 μ | 19 |
| > 2 μ | 190 |
| > 1 μ | 360 |
| Mean diameter | 0,65 μ |

TABLE II

| Particle size | g/kg |
|---|---|
| >20 μ | 12 |
| >10 μ | 26 |
| > 2 μ | 220 |
| > 1 μ | 430 |
| Mean diameter | 0,68 μ |

EXAMPLE 2

The experiment of Example 1 was repeated using a milk of lime containing about 120 kg of CaO per m$^3$ and a gas containing between 29 and 32% of $CO_2$. The carbonation, which was carried out at 32° C., lasted 7 hours 35 minutes with a gas flow rate of between 1,200 and 1,350 m$^3$/hour. The amount of Polysel CA was controlled so that it corresponded to 5 g per kg of calcium carbonate.

4 g of Polysel CA per kg of calcium carbonate were used as the dispersing agent, for fluidizing and homogenizing the calcium carbonate concentrate collected on the filter.

The concentrated aqueous suspension of calcium carbonate obtained contained 71.7% by weight of calcium carbonate crystals and remained stable for more than 30 days. The particle size distribution of the crystals is set out in Table II, above.

EXAMPLE 3 (comparison experiment)

The experiment of Examples 1 and 2 was repeated, but the addition of a polyelectrolyte to the milk of lime was omitted. A milk of lime containing about 122 kg of CaO per m$^3$ and a gas containing between 24 and 32% of $CO_2$ were used at a controlled flow rate of between 1,350 and 1,500 m$^3$/hour for 6 hours 30 minutes. The temperature was kept at between 32° and 34° C. throughout the entire duration of the carbonation. The aqueous suspension of calcium carbonate was filtered and the calcium carbonate concentrate collected on the filter was subjected to a fluidization and homogenization operation in the manner described in Example 1. An aqueous suspension of calcium carbonate crystals, which only contained 63.7% by weight of crystals, was thus obtained. Furthermore, this aqueous suspension proved substantially less stable than that of Examples 1 and 2.

By comparing Examples 1 and 2, on the one hand, with Example 3, on the other hand, the value of the process according to the present invention becomes immediately apparent, this process making it possible to easily obtain, without evaporation and by simple filtration, stable aqueous suspensions containing more than 68% by weight of calcium carbonate crystals.

The invention is not limited to the preceding examples and it can form the subject of numerous modifications.

It will be understood that the above description of the present invention is susceptible to various modifications, changes and adaptations, and the same are intended to be comprehended within the meaning and range of equivalents of the appended claims.

What is claimed is:

1. A process for the preparation of an aqueous suspension of calcium carbonate comprising:
   (a) crystallizing calcium carbonate by carbonating in a dilute aqueous medium a source of calcium ions with a source of carbonate ions in the presence of a water-soluble polyelectrolyte to obtain a dilute aqueous suspension of calcium carbonate;
   (b) separating a wet concentrate of calcium carbonate from the dilute aqueous suspension of calcium carbonate by essentially mechanical separating means to obtain directly a wet concentrate of calcium carbonate containing at least 65% by weight calcium carbonate; and
   (c) fluidizing and homogenizing said wet concentrate in the presence of a dispersing agent to obtain an aqueous suspension of calcium carbonate containing at least 65% by weight calcium carbonate.

2. Process according to claim 1, wherein the polyelectrolyte is selected from polyacids and their alkali metal salts.

3. Process according to claim 2, wherein the polyelectrolyte is selected from polyacids of weakly acid character and having a pK greater than 4 as measured on a 0.01N solution in pure water, and their alkali metal salts.

4. Process according to claim 3, wherein the polyelectrolyte is selected from polyacids derived from polymers containing at least one carboxyl group per 10 carbon atoms and their alkali metal salts.

5. Process according to claim 4, wherein the polyelectrolyte is selected from polymers derived from acrylic, methacrylic and alpha-hydroxyacrylic acids, maleic acid copolymers, carboxylated derivatives of cellulose ethers, and their alkali metal salts.

6. Process according to claim 5, wherein the polyelectrolyte is a sodium polyacrylate.

7. Process according to claim 5, wherein the polyelectrolyte is a sodium poly-alpha-hydroxyacrylate.

8. Process according to claim 1, wherein the amount of polyelectrolyte in the dilute aqueous medium for the crystallization is controlled so that the resulting dilute suspension contains between 1 and 10 g of polyelectrolyte per kg of solids.

9. Process according to claim 8, wherein the resulting dilute suspension contains between 2 and 6 g of polyelectrolyte per kg of solids.

10. Process according to claim 1, wherein a milk of lime is carbonated in order to crystallize the calcium carbonate.

11. Process according to claim 10, wherein the milk of lime is carbonated with a gas containing $CO_2$.

12. Process according to claim 10, wherein the milk of lime is carbonated at a temperature of between 25° and 60° C.

13. Process according to claim 1, wherein the mechanical separating means comprises filtration of the dilute suspension of calcium carbonate.

14. Process according to claim 1, wherein the mechanical separating means comprises draining.

15. Process according to claim 13 wherein the mechanical separating means which filters the dilute aqueous suspension of calcium carbonate further comprises means to drain the resulting filter cake by compressing it and sweeping it with a stream of air without substantial evaporation of the liquid taking place.

16. Process according to claim 1, wherein between 2 and 10 g of dispersing agent per kg of calcium carbonate are used for fluidizing and homogenizing the calcium carbonate concentrate.

17. Process according to claim 16, wherein between 4 and 8 g of dispersing agent are used.

18. Process according to claim 1, wherein the dispersing agent is introduced directly into the calcium carbonate concentrate.

19. Process according to claim 1, wherein said aqueous suspension obtained in step (c) contains between 65 and 80% by weight of calcium carbonate.